United States Patent [19]

Yajima et al.

[11] 4,152,509

[45] May 1, 1979

[54] BOROSILOXANE POLYMERS AND A METHOD FOR PRODUCING THE SAME

[75] Inventors: Seishi Yajima; Kiyoto Okamura; Josaburo Hayashi; Toetsu Shishido, all of Oharai, Japan

[73] Assignee: The Foundation: The Research Institute for Special Inorganic Materials, Kashima, Japan

[21] Appl. No.: 835,373

[22] Filed: Sep. 21, 1977

[30] Foreign Application Priority Data

Sep. 30, 1976 [JP] Japan .............................. 51-116487
Oct. 18, 1976 [JP] Japan .............................. 51-124653

[51] Int. Cl.$^2$ .............................................. C08G 77/04
[52] U.S. Cl. .................................................. 528/4; 528/8; 528/25; 528/43

[58] Field of Search ............... 260/46.5 E, 2 S; 528/4, 528/8, 25, 43

[56] References Cited

U.S. PATENT DOCUMENTS

| | | | |
|---|---|---|---|
| 2,517,945 | 8/1950 | Upson | 260/2 S |
| 2,957,900 | 10/1960 | Groszos | 260/2 S |
| 3,161,613 | 12/1964 | Sprung | 260/2 S |
| 3,519,671 | 7/1970 | Markovitz | 260/2 S |

*Primary Examiner*—Melvyn I. Marquis
*Attorney, Agent, or Firm*—Ladas, Parry, Von Gehr, Goldsmith & Deschamps

[57] ABSTRACT

Novel borosiloxane polymers are produced by heating at least one of a boric acid compound with phenylsilane to effect polycondensation reaction.

11 Claims, 4 Drawing Figures

BOROSILOXANE POLYMERS AND A METHOD FOR PRODUCING THE SAME

The present invention relates to borosiloxane polymers having excellent hydrolysis resistance and heat resistance, and three dimensional network structure and a method for producing the same.

Particularly, the present invention relates to highly cross-linked phenylborosiloxane polymers having Si, O, and B as the skeleton components, and phenyl group at side chain of Si and showing a high conversion to organic compounds on heating at high temperatures under a non-oxidizing gaseous atmosphere and to a method for producing the same.

As heat resistant organic polymers, melamine resins, epoxy resins, Bakelite and the like have been heretofore known. As heat resistant inorganic polymers, chlorinated phosphonitrile and the like have been known. In general, the inorganic polymers are higher in the bonding energy of the main chain than the organic polymers and are stable thermodynamically. However, the inorganic polymers are apt to cause equilibrium between homologous series under high temperatures or in the presence of a catalyst and readily produce cyclic oligomer in many systems, so that the formation of linear polymer is prevented. Furthermore, in heterocyclic inorganic polymers, the skeleton bonding has a fairly strong ionic property, so that such polymers are weak against a polar agent, such as water.

In addition, as the conventional boron-containing polymers, the polymers wherein is the fundamental structure, have been known.

These polymers are borosiloxane polymers having methyl groups and are produced by thermal polycondensation of dimethyldiacetoxysilane and methyl borate ester in diethyl ether solvent. This polymer has a very low molecular weight namely a number average molecular weight of about 200; it is a so-called "oligomer" and has methyl group at the side chain, so that this polymer is low in the hydrolysis resistance and is thermally unstable and the particular use has never been known.

An object of the present invention is to provide novel borosiloxane polymers not having the above described drawbacks and a method for producing the same. Namely, the present invention relates to borosiloxane polymers having phenyl group and to a method for producing the same.

The polymers of the present invention will be explained in detail.

The polymers of the present invention are transparent borosiloxane polymers, more than 80% of which is constituted with the structural units (A), (B) and (C) as shown hereinafter, wherein the structural units (A) and (B) are alternately arranged with the structural unit (C) being positioned between the structural units (A) and (B), and a ratio of the unit A to the unit B is 1:1 to 2, the number average molecular weight is 500–10,000, the intrinsic viscosity is 0.01 to 3.00 and the density is 1.00 to 2.00 g/cm$^3$.

and the concrete structural embodiments are shown as follows:

a. The structure shown by the following formula b. The structure shown by the following formula c. The structure shown by the following formula d. The structure shown by the following formula e. The structure shown by the following formula f. The structure shown by the following formula The borosiloxane polymers of the present invention have mainly the above described formula (a) and in addition to the above formula (a) have at least one of the above described formulae (b) to (f).

The above described structural unit (B) may contain less than 10 mol% of the following structural unit (B').

(B')

When the infrared absorption spectrum was measured with respect to the polymer of the present invention, at about 3,400 cm$^{-1}$ and about 3,200 cm$^{-1}$, the absorption of terminal Si-OH and B-OH was observed respectively and the absorptions assigned to benzene ring at about 1,600 cm$^{-1}$, B-O-(Si) at about 1,340 cm$^{-1}$ and Si-O-(B) at about 1,080 cm$^{-1}$ were observed and it has been found that the polymers of the present invention have B, Si and O as the skeleton components and phenyl group at the side chain of Si.

The borosiloxane polymers of the present invention have a number average molecular weight of 500–10,000, an intrinsic viscosity of 0.01–3.00 and are transparent product, in which the absorption at more than 350 nm is not observed in the ultraviolet absorption spectrum and have a refractive index of 1.20–1.70, a density of 1.00–2.00 g/cm$^3$ and a softening temperature of higher than 100°–400° C.

The number average molecular weight was measured by the vapor pressure process, in which the polymer is dissolved in benzene solvent. Depending upon the condition of the production method, the polymers having the molecular weight of less than 500 also can be produced, but the polymers having more than 500 are excellent in the properties.

The polymers of the present invention are more excellent in the hydrolysis resistance and the thermal stability than the conventional borosiloxane polymers having a smaller average molecular weight and containing methyl group as shown in the following Table 1.

Table 1

| | Hydrolysis resistance 10 hrs in water | | Heat resistance | | Number average molecular weight | Residual percentage in heating at high temperatures (wt%) |
|---|---|---|---|---|---|---|
| | Water absorbing percentage | Swelling | Softening point | Inflammability | | |
| Known dimethyl-borosiloxane polymer | 20 wt % | noticeable | 70° C. | easy | ~200 | 8.2 |
| Present invention diphephyl-borosiloxane polymer | 0 wt % | No | >170° C. | difficult | 1,100 | 46.2 |

The residual percentage in heating at high temperatures was determined by TGA, which was effected under argon atmosphere by heating from room temperature to 1,000° C. at an increasing temperature rate of 10° C./min.

As shown in the above Table 1, the polymer of the present invention is much larger than the known polymer in the number average molecular weight and the residual percentage in heating at high temperatures.

The reason why the polymer of the present invention is excellent in the hydrolysis resistance and the thermal stability as mentioned above will be based on the fact that the polymer has phenyl group at the side chain of Si. The polymer of the present invention is different from the polymer having methyl group. The phenyl group is a relatively large group and this group efficiently occupies the space in the high molecule and mitigates the localization of electron density in Si-O-B bond whereby the phenyl group restrains the polarization of the main chain. Accordingly, the polymer of the present invention may have resistance against attack of a polar agent, such as water, and against heating.

In the polymers of the present invention, the larger the cross-linking degree, the more excellent the above described hydrolysis resistance and the thermal stability are.

Then, an explanation will be made with respect to the method for producing the polymers of the present invention.

As the starting material, boric acid or the derivatives thereof and various phenylsilanes are used.

As boric acid compounds of the main starting material of the present invention, use may be made of at least one of boric acid, boric anhydride, metal salts of boric acid, boron halides, boric acid esters and boroxols. For example, as the above described boric acid, use may be made of orthoboric acid ($H_3BO_3$) and metaboric acid ($HBO_2$). As metal salts of boric acid, use may be made of alkali or alkaline earth metal salts, such as borax ($Na_2B_4O_7.10H_2O$), sodium tetraborate pentahydrate ($Na_2B_4O_7.5H_2O$), pandermite ($Ca_2B_6O_{11}.3H_2O$), colemanite ($Ca_2B_6O_{11}.5H_2O$), boronatrocalcite ($NaCaB_5O_9.6H_2O$). As boron halides, use may be made of $BX_3$ (X=F, Cl, Br, I). Boric acid esters include the compounds shown by the general formula of $B(OR)_3$ and boroxols include the compounds shown by the general formulae of $(RBO)_3$, $(ROBO)_3$ and $(RBO)_2$. In the above formulae, R is at least one of hydrogen atom, hydroxyl group, alkyl group, cycloalkyl group, alkoxy group, acyloxy group, aryl group, alkaryl group, silyl group, aralkyl group, perfluoroalkylethyl group, halogen atoms and metal atoms.

As various phenylsilanes, use may be made of the following phenylsilanes.

(1)

(2)

(3)

In the above formulae, $R_1$, $R_2$ and $R_3$ are Cl or OH.

In the present invention, the above phenylsilane (1) alone or a mixture of the phenylsilane (1) with less than 20% of at least one of the phenylsilanes (2) and (3) may be preferably used. Namely, when the plasticity is desired, the phenylsilane (2) is added and when the high cross-linking is desired, the phenylsilane (3) is added. Even if the phenylsilanes other than the above described phenylsilanes (1)–(3), for example, phenylpolysilane, phenylsiloxane, phenylcarbosilane, phenylcarbosiloxane or phenylsilanes which have the groups other than Cl or OH as R, are used, borosiloxane polymers which are a little similar to or different from the polymers of the present invention, can be obtained, but the excellent properties as in the polymers of the present invention can not be obtained and these polymers have drawbacks in view of the high cost of the starting material and the production method, such as the complicated reaction.

The molar ratio of boric acid or the derivatives thereof to various phenylsilanes can be optionally selected within a range of 9:1–1:9, but when the molar ratio of the boric acid compounds to the above described phenylsilanes is larger than 9:1, that is, the amount of the boric acid compounds is too large, the borosiloxane polymer having Si, B and O as main skeleton components is obtained only in a slight amount, while when the molar ratio of the boric acid compounds to the phenylsilanes is less than 1:9, that is, the amount of the boric acid compounds is too small, even though the polycondensation reaction occurs, the properties of the obtained polymers are substantially the same as those of the organosilicon polymers containing no boron, so that the molar ratio of the above described two starting materials must be within the range of 9:1–1:9. The preferable molar ratio is 3:2–2:3. Within this molar ratio, the ratio of B to Si in borosiloxane polymers becomes 1:1–2 and the above described excellent properties appear most effectively.

According to the present invention the above described boric acid or the derivatives thereof and various phenylsilanes are subjected to a primary polycondensation reaction. The mixture of these starting materials, if necessary, added with a solvent such as benzene, toluene, xylene, diethyl ether, dioxane, n-butyl ether, chloroform, tetrahydrofuran and the like, is heated at a temperature of 50°–500° C. In this reaction the atmosphere is preferred to be a non-oxidizing atmosphere. In this case, if necessary, an acid acceptor, such as, pyridine, triethylamine may be present and in this case, after the reaction an excess amount of the acid acceptor and the formed salts of the halides should be completely removed. The solvents to be used in this reaction must not react with the above described starting materials and most of the reaction products are viscous liquid or solid and the use of the solvent or the acid acceptor promotes the reaction and the reaction time can be shortened.

When the temperature of the polycondensation reaction in the present invention is lower than 50° C., the polycondensation reaction does not substantially occur, while said temperature is higher than 500° C., the depolymerization is liable to be caused, so that the polycondensation reaction must be carried out within the temperature range of 50°–500° C.

After the reaction is completed, methanol, acetic acid, water, sodium bicarbonate or the mixtures thereof is added thereto and the mixture is heated at a temperature of 50°–100° C. for 0.5–2 hours and then filtration or distillation is effected to remove by-product, solvent and unreacted starting materials and to obtain solid or liquid intermediate product of the polymer of the present invention. The above described intermediate product is heated at a temperature of 100°–800° C. as such or if necessary in the presence of a catalyst, which promotes the dehydration reaction, such as sulfuric acid, nitric acid and the like under at vacuum or at least one of atmospheres selected from an inert gas, CO gas and $CO_2$ gas, to effect a secondary thermal polycondensation, whereby highly cross-linked borosiloxane polymers having phenyl group according to the present invention can be obtained.

In general, in the polymers having a large group at the side chain, cyclization due to thermal vibration hardly occurs. This phenomenon means that the formation of cyclic oligomer, that is depolymerization due to heating, hardly occurs. The polymers of the present invention have a relatively large phenyl group at the side chain, so that the polycondensation can be attained by heating without causing depolymerization.

In this secondary polycondensation reaction, when the temperature is lower than 100° C., the polycondensation does not substantially occur, while when the temperature is higher than 800° C., the depolymerization is apt to be caused, so that the above described polycondensation must be effected within the temperature range of 100°–800° C.

In the present invention, the complete polycondensation reaction is intended by heat treatment at 100°–800° C., so that the obtained polymer has a bulk density of more than 80% and is highly cross-linked products having three dimensional network structure.

The above described polymers of the present invention have been fully cross-linked, but if these polymers are subjected to radical polymerization by irradiating radiation of about 250,000 r/hr by means of γ-ray source of $Co^{60}$, more highly cross-linked polymers can be obtained.

The polymers of the present invention have high hydrolysis resistance, thermal stability and transparency and by utilizing these properties the polymers can be used for heat resistant window, heat medium, high temperature packing materials, wall materials, non-flammable paints, adhesives for high temperatures. In addition, the polymers of the present invention can be used for a binder, which is mixed with various ceramic powders or cermet starting material powders and heated under a pressure to obtain sintered moldings. Cermets are combinations of metals and ceramic materials as described by W. D. Kingery "Introduction to Ceramics" of John Wiley and Sons, Inc. In any of the above described cases, the polymers of the present invention can develop an epoch-making effect.

Figure 1:
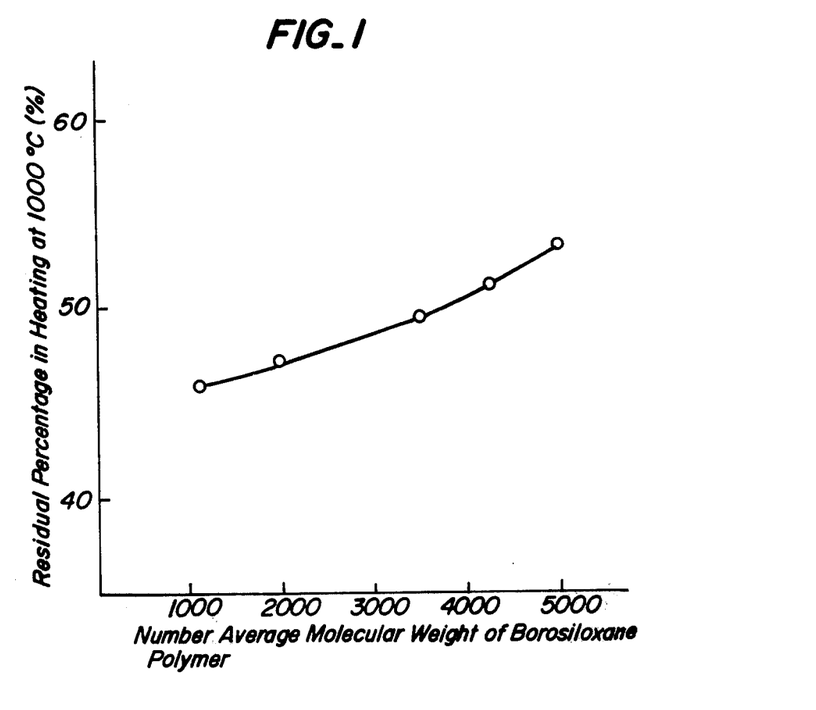
FIG. 1 is a graphical representation showing a relation between the number average molecular weight of phenylborosiloxane polymer and the residual percentage in heating at 1,000° C.

FIG. 1 shows a relation of the number average molecular weight of diphenylborosiloxane polymer produced in the present invention to the residual percentage in heating at 1,000° C. As seen from FIG. 1, the number average molecular weight and the residual percentage have a close relation.

The borosiloxane polymers produced by the production method of the present invention, which have Si, B and O as the skeleton components, are much larger than the well-known polymers in any of the number average molecular weight and the residual percentage, so that the borosiloxane polymers of the present invention can be presumably advantageously used in the many field.

The present invention will be explained in more detail.

For a better understanding of the invention, reference is taken to the accompanying drawings, wherein.

The following examples are given for the purpose of illustration of this invention and are not intended as limitations thereof.

EXAMPLE 1

Three moles of diphenyldichlorosilane and 2 moles of boric acid were added to benzene, and the resulting mixture was refluxed and reacted at 90° C. for 24 hours under nitrogen gas atmosphere. A sodium bicarbonate aqueous solution was added to the reaction mixture to neutralize the HCl remaining in the reaction mixture. The above treated reaction mixture was separated into an aqueous solution layer and a benzene solution layer in a separating funnel. The aqueous solution layer was cast away and only the benzene solution layer was gathered. The benzene in the solution was evaporated and removed to obtain a white powder. The white powder was heated at 400° C. for 1 hour under argon atmosphere, and then cooled to obtain a colorless transparent polymer.

Figure 2:
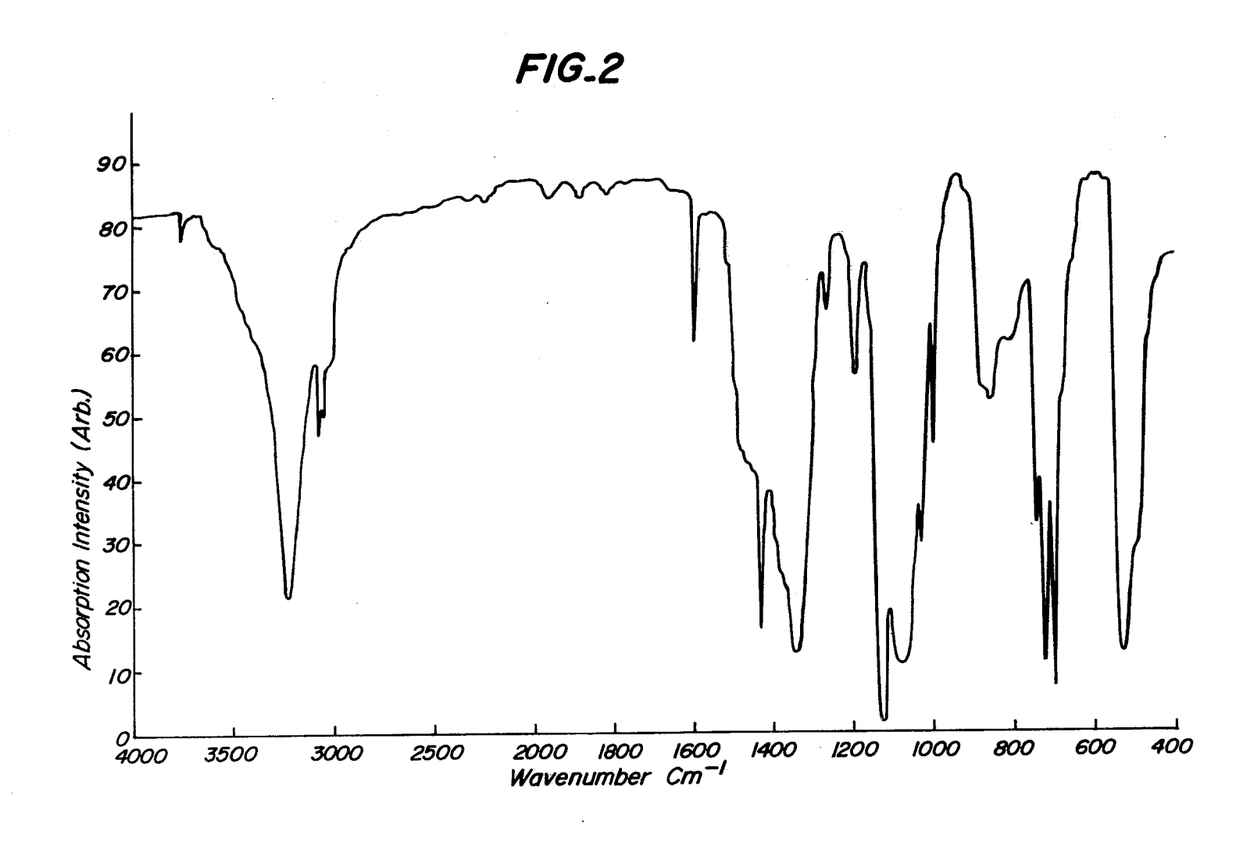
FIG. 2 is infrared absorption spectrum of phenylborosiloxane polymer of the present invention.

The resulting polymer is not hydrolyzed in air and is thermally stable and non-flammable as shown in Table 1. The IR spectrum of the resulting polymer is shown in FIG. 2. In the IR spectrum an absorption assigned to terminal Si-OH is observed at about 3,400 $cm^{-1}$, that assigned to terminal B-OH is observed at about 3,200 $cm^{-1}$, that assigned to benzene nucleus is observed at about 1,600 $cm^{-1}$, that assigned to B-O-(Si) is observed at about 1,340 $cm^{-1}$ and that assigned to Bi-O-(B) is observed at about 1,080 $cm^{-1}$. Therefore, it was found that the polymer was a diphenylborosiloxane polymer.

The resulting polymer was pulverized and dissolved in benzene, and the number average molecular weight of the polymer was measured. It was found that the polymer had a number average molecular weight of 1,100.

Figure 3:
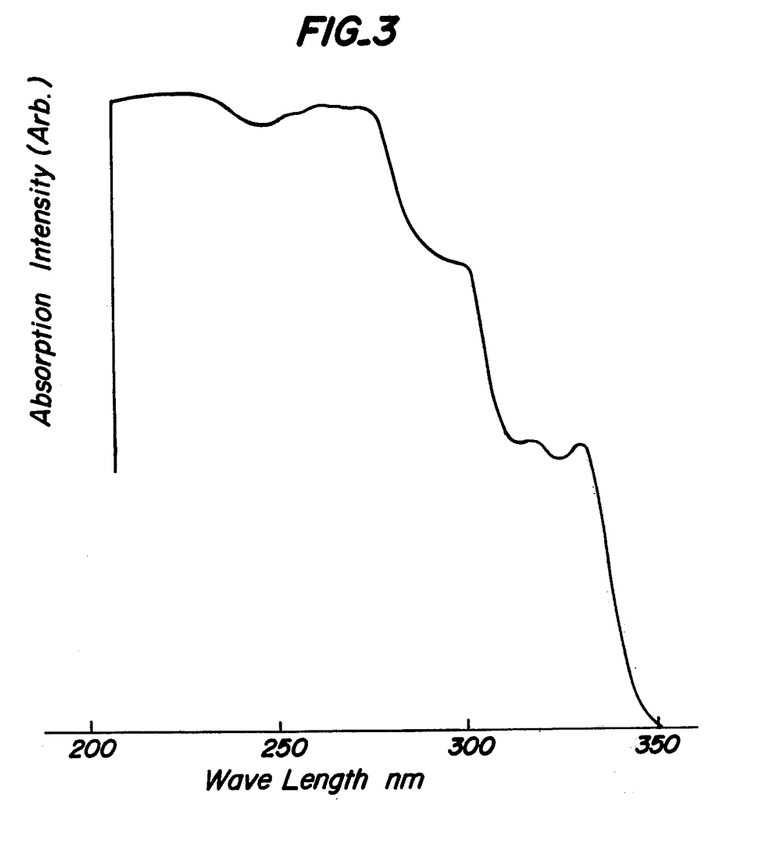
FIG. 3 is ultraviolet ray absorption spectrum of the polymer according to the present invention.

The UV spectrum of the polymer is shown in FIG. 3. In the UV spectrum, there are observed a gently sloped large absorption peak at about 210–280 nm, a shoulder absorption at 303 nm, and absorption peaks at 320 nm and 330 nm. However, there is no peak in the wave length range of longer than 350 nm. Therefore, it can be fully understood from the UV spectrum that the polymer is transparent.

The residual percentage of the polymer in heating up to 1,000° C. under argon atmosphere was 46.2%. Further even when the polymer was immersed in water for 10 hours, there were neither devitrification due to absorption of water in the polymer nor change of the weights of the polymer before and after the immersing in water. This shows that the polymer has an excellent water resistance. The polymer softened at 170° C., but did not ignite until the polymer was heated up to a high temperature of not lower than 600° C. Therefore, it was found that the polymer was non-flammable.

Figure 4:
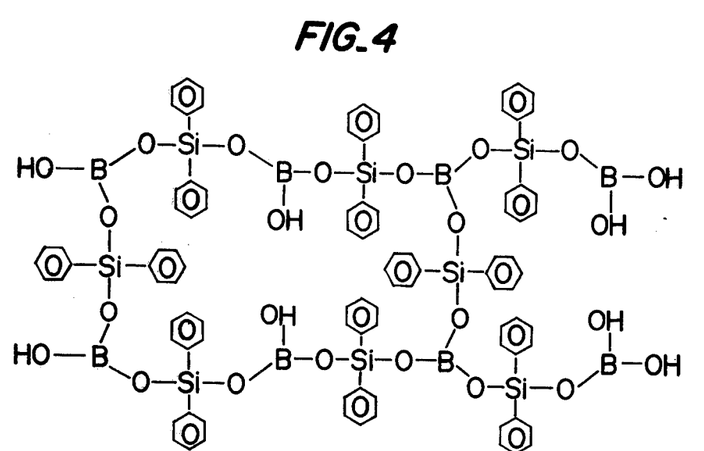
FIG. 4 is a view showing one embodiment of the chemical structure of the polymer according to the present invention.

The reason why the above obtained polymer is excellent in the hydrolysis resistance and in the heat resistance is based on both of the presence of the highly crosslinked adjacent polymer chains resulted from the above described heat treatment at 400° C. for 1 hour under argon atmosphere and the presence of phenyl group. The polymer has a three dimensional network structure, for example, shown in FIG. 4.

The above obtained polymer can be directly used in various optical instruments and other instruments by utilizing the transparency for light, hydrolysis resistance, heat resistance and inflammability.

Powdery SiC having a particle size of less than 325 meshes was mixed with 10% by weight, based on the amount of the powdery SiC, of the above obtained polymer, and the resulting mixture was cold pressed under a load of 2 ton/$cm^2$ and then heated up to 1,300° C. under nitrogen atmosphere to obtain an SiC molded article. This molded article had an apparent density of 82% based on the theoretical density and a flexural strength of 10.4 kg/$mm^2$. Even when the molded article was heated up to 1,500° C. in air, the mechanical strength did not decrease. Further, the molded article had a high corrosion resistance against ordinary acids and bases. SiC is generally poor in the self-sintering property and can not be made into a molded article unless SiC is hot pressed at about 2,000° C. However, when SiC is mixed with the above obtained polymer, an SiC molded article can be obtained at relatively low temperature of 1,300° C. as described above, and the resulting SiC molded article has high strength, heat resistance and corrosion resistance.

EXAMPLE 2

The polymer obtained in Example 1 was irradiated with γ-ray at 75° C. at a rate of 250,000 r/hr by means of a Co$^{60}$ γ-ray source to effect a radical polymerization of the polymer, and a very hard transparent polymer was obtained. This polymer was solvent-insoluble and was too high in the molecular weight to be measured by the use of solvent. This polymer was much better in the hydrolysis resistance and heat resistance than the polymer obtained in Example 1, and had a surface hardness of 60 in the microvickers value (load: 300 g, 30 seconds). The residual percentage of the polymer in heating up to 1,000° C. under argon atmosphere was 56.1%. The high hydrolysis resistance heat resistance and hardness of the polymer in this Example 2 are due to the radical polymerization by the irradiation.

EXAMPLE 3

36 g of diphenyldichlorosilane, 6.1 g of boric acid and 2 g of phenyltrichlorosilane were reacted at 200° C. for 24 hours under nitrogen gas atmosphere, and the reaction mixture was dissolved in 100 ml of xylene, and then filtered. Xylene and unreacted diphenyldichlorosilane and phenyltrichlorosilane were removed from the filtrate by evaporation under reduced presure to obtain 25.5 g of a white powdery borosiloxane polymer. The polymer was further heated at 450° C. for 2 hours under argon atmosphere to obtain a transparent resinous polymer having a number average molecular weight of 3,500. The residual percentage of the resinous polymer in heating up to 1,000° C. under argon atmosphere was 49.2%. Why the polymer obtained in this Example 3 has a relatively high number average molecular weight is probably due to the reason that, since phenyltrichlorosiloxane used in a very small amount is a trifunctinal compound, the polymer has a high degree of crosslinking.

EXAMPLE 4

Under the same reaction condition as described in Example 3, 36 g of diphenyltrichlorosilane, 6.1 g of boric acid and 1.5 g of triphenylchlorosilane were reacted under reflux to obtain a white powdery borosiloxane polymer. This polymer was heated at 400° C. for 2 hours under argon atmosphere to obtain a transparent and tough resinous polymer having a number average molecular weight of 900. The residual percentage of the resinous polymer in heating up to 1,000° C. under argon atmosphere was 42.8%. It is considered that, since a very small amount of monofunctional triphenylchlorosilane is added to the starting materials, the number average molecular weight of the resulting polymer is suppressed to be low to make the polymer plastic.

EXAMPLE 5

A mixture of 30 g of diphenyldihydroxysilane and 20 g of trimethyl borate B(OCH$_3$)$_3$ was refluxed for 30 hours under nitrogen gas atmosphere, and then excess trimethyl borate and methanol developed during the raction were distilled off under reduced pressure. The above treated product was again heated at 400° C. for 3 hours under nitrogen gas atmosphere to obtain 22 g of a polycondensation product. The resulting polymer was transparent and resinous at room temperature and had a number average molecular weight of 5,000. The residual percentage of the polymer in heating up to 1,000° C. under argon atmosphere was 50.3%.

EXAMPLE 6

Under nitrogen gas atmosphere, 30 g of diphenyldihydroxysilane was dissolved in 150 ml of n-butyl ether, and 14 g of boric acid was added gradually to the solution. After completion of the addition, the resulting mixture was refluxed for 19 hours and then the solvent was distilled off under reduced pressure, and the resulting product was heated at 350° C. for 4 hours under nitrogen gas atmosphere to obtain 20 g of a polycondensation product. The resulting polymer was transparent and resinous and had a number average molecular weight of 4,200. The residual percentage of the polymer in heating up to 1,000° C. under argon atmosphere was 46.8%.

EXAMPLE 7

To a mixture of 760 g of diphenyldichlorosilane and 124 g of boric acid was added 1,200 cc of n-butyl ether, and the resulting mixture was refluxed and reacted at 100° C. for 20 hours while stirring under nitrogen gas atmosphere. After completion of the reaction, methanol was added to the reaction product to neutralize residual chlorine, and then the n-butyl ether was removed by filtration or distillation to obtain a white reaction product. This product was heated at 400° C. for 1 hour under vacuum to obtain a colorless transparent polymer. The resulting polymer had a number average molecular weight of 850 and showed elementary analysis values of Si: 12.02%, C: 62.2%, H: 4.7%, O: 14.03% and B: 3.35%. Therefore, this polymer was found to be a diphenylborosiloxane polymer. The residual percentage of the polymer in heating up to 1,000° C. under argon atmosphere was 41.5%.

While, when the above obtained white reaction product was heated at 500° C. for 3 hours under argon atmosphere containing a very small amount of oxygen, the resulting polymer showed elementary analysis values of Si: 11.6%, C: 59.9%, H: 4.2%, B: 4.4% and O: rest. Further, when the reaction product was heated, it became highly viscous. Accordingly, it is considered that, when the above obtained white reaction product is heated under the argon atmosphere, a small amount of phenyl groups are split from the product to form a polymer having a highly crosslinked structure as compared with the polymer obtained by heating the white reaction product under vacuum. The polymer above obtained by the heating under the argon atmosphere had a number average molecular weight of 1,100, and the residual percentage of the polymer in heating up to 1,000° C. under argon atmosphere was 51.1%.

What is claimed is:

1. Borosiloxane polymers having a number average molecular weight of 500–10,000, an intrinsic viscosity of 0.01–3.00 and a density of 1.00–2.00 g/cm$^3$, more than 80% of which is constituted with the following structural units (A), (B) and (C) and in which the structural units (A) and (B) are alternately arranged with the structural unit (C) being positioned between the units (A) and (B) and in which a ratio of the unit (A) to the unit (B) is 1:1–2:

2. The borosilane polymers as claimed in claim 1, wherein less than 10 mol% of said structural unit (B) is replaced by the following structural unit (B'):

3. A method for producing borosiloxane polymers, which comprises heating a mixture of at least one of boric acid compound selected from the group consisting of boric acid, boric anhydride, metal salts of boric acid, boron halides, boric acid esters and boroxols, with a phenylsilane having the following general formula (1) at a temperature of 50°–500° C. to effect a primary polycondensation reaction, removing unreacted starting materials, and again heating the obtained reaction product at a temperature of 100°–800° C. under vacuum or at least one of an inert gas, CO gas and $CO_2$ gas to effect a secondary polycondensation reaction wherein $R_1$ and $R_2$ are Cl or OH.

4. The method as claimed in claim 3, wherein less than 20 mole% based on the amount of said phenylsilane of general formula (1) is replaced by at least one of phenylsilanes having the following general formulae (2) and (3)

wherein $R_1$, $R_2$ and $R_3$ are Cl or OH.

5. The method as claimed in claim 3, wherein the primary polycondensation reaction is effected in the presence of a solvent and/or an acid acceptor.

6. The method as claimed in claim 5, wherein after the primary polycondensation, the solvent and the acid acceptor are removed by filtration or distillation.

7. The method as claimed in claim 3, wherein the secondary polycondensation reaction is effected in the presence of a catalyst.

8. The method as claimed in claim 5, wherein said solvent is benzene, toluene, xylene, diethyl ether, dioxane, n-butyl ether, chloroform or tetrahydrofuran.

9. The method as claimed in claim 5, wherein said acid acceptor is pyridine or triethylamine.

10. The method as claimed in claim 7, wherein said catalyst is sulfuric acid or nitric acid.

11. Borosiloxane polymers having no ultraviolet ray absorption at more than 350 nm and having a refractive index of 1.20–1.70, a number average molecular weight of 500–10,000, an intrinsic viscosity of 0.01–3.00, a density of 1.00–2.00 g/cm$^3$ and a softening point of 100°–400° C., which are mainly constituted of the following structural unit (a) and have at least one of the following structural units (b)–(f):

a. The structure shown by the following formula b. The structure shown by the following formula c. The structure shown by the following formula d. The structure shown by the following formula

* * * * *